United States Patent
Liu et al.

(10) Patent No.: US 11,143,934 B2
(45) Date of Patent: Oct. 12, 2021

(54) METHOD FOR ELIMINATING NOISE AND PORTABLE ELECTRONIC DEVICE USING SAME

(71) Applicant: AAC Technologies Pte. Ltd., Singapore (SG)

(72) Inventors: Yang Liu, Shenzhen (CN); Shun Guo, Shenzhen (CN); Renlong Yu, Shenzhen (CN); Rongguan Zhou, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 609 days.

(21) Appl. No.: 16/104,523

(22) Filed: Aug. 17, 2018

(65) Prior Publication Data

US 2019/0155127 A1   May 23, 2019

(30) Foreign Application Priority Data

Nov. 17, 2017 (CN) .......................... 201711143446.X

(51) Int. Cl.
| | |
|---|---|
| H04R 25/00 | (2006.01) |
| G03B 5/02 | (2021.01) |
| H04R 1/02 | (2006.01) |
| H04M 1/02 | (2006.01) |
| G10K 9/22 | (2006.01) |
| G02B 27/64 | (2006.01) |
| H04R 7/04 | (2006.01) |
| H04M 1/19 | (2006.01) |
| G02B 7/09 | (2021.01) |

(52) U.S. Cl.
CPC ............. *G03B 5/02* (2013.01); *G02B 27/646* (2013.01); *G10K 9/22* (2013.01); *H04M 1/0264* (2013.01); *H04R 1/028* (2013.01); *G02B 7/09* (2013.01); *G03B 2205/0069* (2013.01); *H04M 1/19* (2013.01); *H04R 7/045* (2013.01); *H04R 2499/11* (2013.01)

(58) Field of Classification Search
CPC .......... G03B 5/02; G02B 27/646; G10K 9/22; H04M 1/0264; H04R 1/028
See application file for complete search history.

(56) References Cited

U.S. PATENT DOCUMENTS

| | | | | |
|---|---|---|---|---|
| 2005/0253957 A1* | 11/2005 | Gustavsson | ............. | H04M 1/03 348/363 |
| 2018/0139389 A1* | 5/2018 | Park | ................... | H04N 5/23212 |

* cited by examiner

*Primary Examiner* — Simon King
(74) *Attorney, Agent, or Firm* — IPro, PLLC; Na Xu

(57) ABSTRACT

The present application discloses a portable electronic device. The device includes a case; a camera lens fixed to the case; a sound generator attached to the case for producing sounds; and a central process unit and a circuit system for providing controlling current to the camera lens. The camera lens includes a side wall and a lens holder moveable relative to the side wall. The lens holder is driven to a predetermined position farther away from the case than an initial position, when the sound generator is producing sounds. The present application further provides a method for eliminating noise by applying controlling current to the lens holder to move the lens holder to a position farther away from the case for avoiding collision between the case and the lens holder.

8 Claims, 3 Drawing Sheets

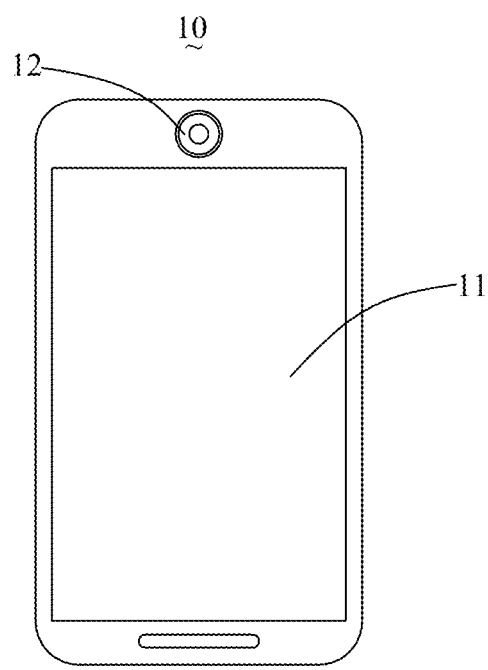
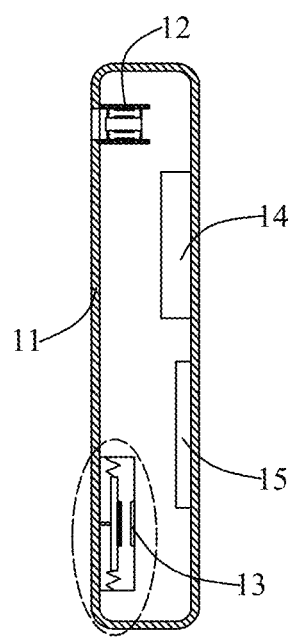 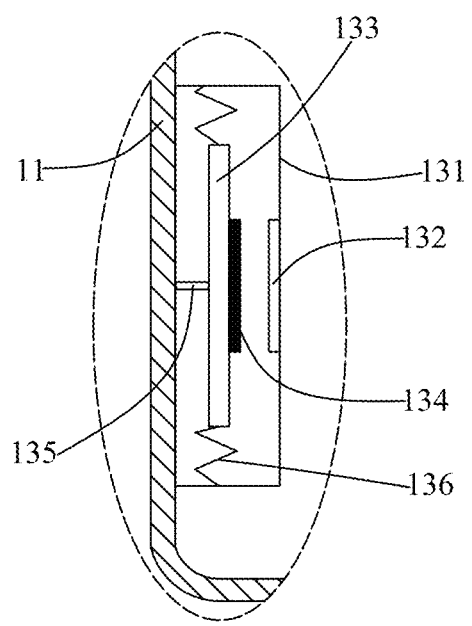
Fig. 1
Fig. 2
Fig. 3

METHOD FOR ELIMINATING NOISE AND PORTABLE ELECTRONIC DEVICE USING SAME

FIELD OF THE PRESENT DISCLOSURE

The present disclosure relates to portable electronic devices, and more particularly to a method for eliminating noises during movement of component in the portable electronic device.

DESCRIPTION OF RELATED ART

Sound generation is an important function of a portable electronic device, like a mobile phone. In related devices, e.g. a mobile phone, the corresponding sound generator is typically a speaker, or is an assembly and cooperation of an actuator with a screen of the mobile phone. The speaker is a transducer for converting electrical signals into audible sounds. When a speaker is used, the screen of the mobile phone needs to be provided with some through-holes to transmitting the sound produced by the speaker to outside. When an actuator is used, the actuator, when activated, brings the screen to vibrate for radiating soundwaves, which makes it possible to dispose no through-holes in the screen, because the screen itself is a sound generator for directly transmitting sounds.

In a mobile phone, a component for capturing image is called camera lens. The camera lens generally includes a lens holder cooperating with a magnetic circuit system for providing Auto Focus/Anti-shaking functions. In fact, the lens holder is a movable member suspended by an elastic spring, and the position of the lens holder can be adjusted due to the force generated by the magnetic circuit system. When the screen, or other component driven by the actuator for generating sound vibrates, the lens holder would be shocked and would further collide on part/element adjacent to the lens holder, which would produce noise. The noise produced by the collision will badly affect the acoustic performance of the sound generated by the actuator and the screen.

Therefore, it is desired that a method for eliminating the noise produced by the collision would be researched. And accordingly, a portable electronic device using the method is also desired.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

FIG. 1 is an illustrative top view of a portable electronic device in accordance with an exemplary embodiment of the present invention;

FIG. 2 is an illustrative and enlarged cross-sectional view of the portable electronic device in FIG. 1;

FIG. 3 is an enlarged view of the circled part in FIG. 2;

DETAILED DESCRIPTION OF THE EXEMPLARY EMBODIMENTS

Figure 4:
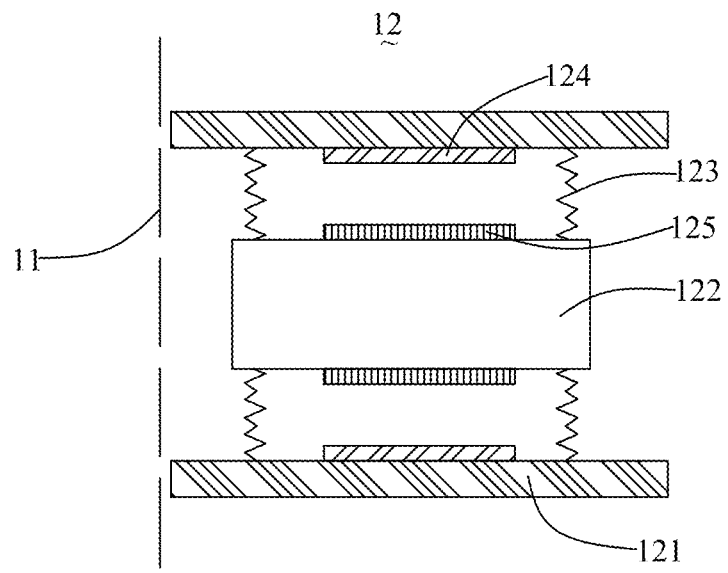
FIG. 4 is an illustrative view of a camera lens of the portable electronic device, wherein a lens holder of the camera lens is at an initial position.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

The present disclosure relates to a portable electronic device 10. An embodiment of the portable electronic device is a mobile phone. Referring to FIGS. 1-2, the portable electronic device 10 in accordance with an exemplary embodiment includes a case 11, a camera lens 12 fixed to the case 11, a sound generator 13 attached to the case 11, a central process unit 14 and and a circuit system 15 both electrically connected to the camera lens 12 and the sound generator 13. The camera lens 12 is used to capture images or photos, and the sound generator 13 is used for producing audible sounds. The case 11, in the embodiment, is a housing having an accommodating space for receiving the camera lens 12 and the sound generator 13. In an alternative embodiment, the case may be a fixed component, like a printed circuit board or other element received in a housing of a mobile phone. And, the words "fixed" "attached" used in the present application mean a position relationship between two components which are relatively fixed to each other directly or indirectly. So that, when a component, i.e., the camera lens 12 is not mounted on the case 11 but a distance between the case 1 land the camera lens 12 is fixed, the camera lens 12 is also fixed to or attached to the case 11.

The central process unit 14 and the circuit system 15 could be separated units or an integrated unit for providing electrical signals to and controlling the camera lens 12 and the sound generator 13.

In the embodiment, the sound generator 13 is an actuator. As shown in FIG. 3, the sound generator 13 includes a housing 131 fixed to the case 11, a magnet 132 received in the housing 131, a vibrator 133 suspended by a suspension 136 in the housing 131, and a driving coil 134 interacting with the magnet 132 for driving the vibrator 133 to vibrate in the housing 131. When vibrating, the vibrator 133 hits the case 11 or other component of the portable electronic device 10 for producing audible sounds.

For effectively producing sounds, a linking post 135 is provided to be fixed to the vibrator 133. When the vibrator 133 vibrates, the linking post 135 hits the case 11 for producing sounds.

In this embodiment, the magnet 132 is mounted on the housing 131 and the driving coil 134 is fixed to the vibrator 133. In an alternative embodiment, the magnet 132 may be mounted on the vibrator 133 and the driving coil 134 may be mounted on the housing 131. In fact, the actuator could also be other component as long as the actuator has the ability of hitting the case 11. Thus, the actuator, in actual instances, could be a piezoelectricity actuator providing a vibrator served as by a piezoelectricity member.

Figure 5:
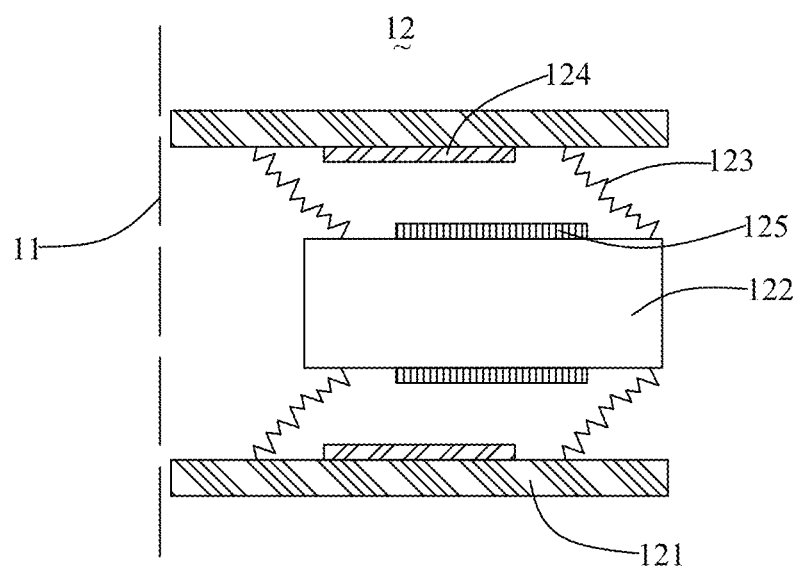
FIG. 5 is similar to FIG. 4, wherein the lens holder is at a predetermined position.

Referring to FIGS. 4-5, the camera lens 12 is fixed to the case 11. The camera lens 12 includes a sidewall 121 attached to the case 11 for positioning the camera lens 12, a lens holder 122 movable relative to the side wall 121 and being suspended by an elastic spring 123, a lens magnet 124 attached to the side wall 121, and a lens coil 125 attached to the lens holder 122.

Similar to the sound generator 13, the lens magnet 124 and the lens coil 125 are also used for interacting with each other for driving the lens holder 122 to move relative to the side wall 121. Typically, the lens coil and the lens magnet are used for realizing auto focus or optical image stabilization. In fact, the lens magnet could be arranged on the lens holder, and the lens coil could be arranged on the side wall, according to actual requirements.

The elastic spring 123 suspends the lens holder 122 and provides the lens holder 122 a restoring force to force the lens holder 122 to move back to an initial position. The initial position is where the lens holder stays when no current is applied to the lens coil. In the application, the lens holder 122 is used for carrying a plurality of lenses for collecting lights transmitted or reflected from an object.

When the camera lens captures an image, the central process unit and the circuit system provides electrical signal (current) to the lens coil 125 and the lens holder 122 is accordingly forced by the electro-magnetic force produced by the interaction between the lens coil 125 and the lens magnet 124 to move forward or backward to perform auto-focusing or anti-shock (optical image stabilization). Here, we define the movement of the lens holder 122 as a functional movement which means the movement is performed to achieve focus or stabilization so that the camera lens can obtain a clear image (photo).

Besides the functional movement, the lens holder 122 is further provided with a noise eliminating movement. Referring to FIG. 5 showing a predetermined position where the lens holder 122 stays when the sound generator is working and the lens coil 125 is electrified by the central process unit and the circuit system.

As described above, the sound generator hits the case for producing sounds. When the sound generator is working, i.e., hitting the case to produce sounds, the lens holder 122 will also vibrate because the lens holder 122 is suspended by the elastic spring 123. During the vibration of the lens holder 122, the case would be collided on by the lens holder 122, which will produce noises and further affect the acoustic performance of the sound generator. Therefore, the present invention provides a predetermined position to the lens holder 122 to make the lens holder 122 farther away from the case 11, which means that the predetermined position is farther away from the case than the initial position. The movement of the lens holder at the time when the sound generator is working is defined as the "noise eliminating movement".

Figure 6:
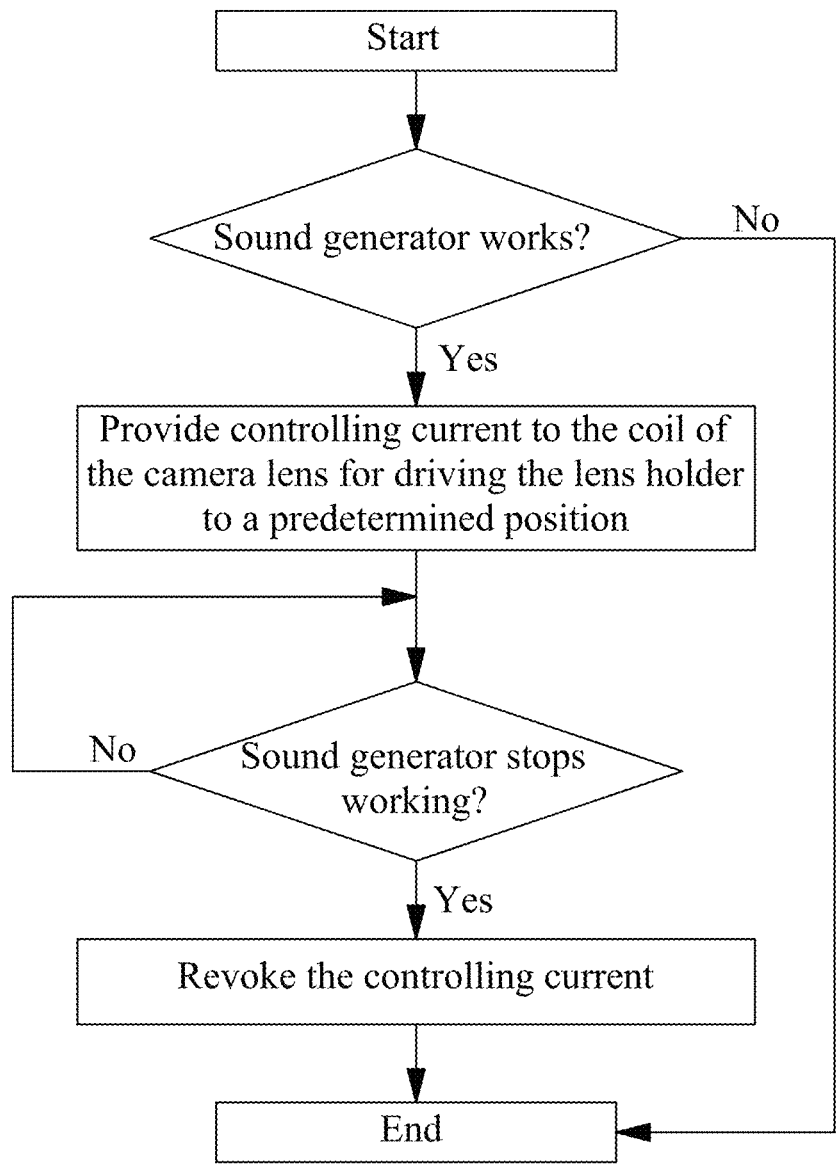
FIG. 6 is a flow chart of a method of eliminating noise.

Referring to FIG. 6, a flow chart of a method for eliminating noise produced by the collision between the lens holder and the case is shown. A first step of the method is to judge whether the sound generator is working or not. When the sound generator is not working, no further step is needed to be performed. When the sound generator is working, a second step of providing controlling current to the lens coil of the camera lens to drive the lens holder to the predetermined position is performed. The controlling current will last until it is judged that the sound generator stops working. When the sound generator stops working, the controlling current will revoked.

By virtue of the noise eliminating movement performed by applying controlling current to the lens coil of the camera lens for driving the lens holder to move farther away from the case, possible collision between the case the lens holder is avoided, and therefore possible noise produced by the possible collision is prevented. The acoustic performance of the sound generator is thus improved.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A portable electronic device, comprising:
   a case;
   a camera lens fixed to the case, the camera lens including a side wall and a lens holder moveable relative to the side wall;
   a sound generator attached to the case for producing sounds;
   a central process unit and a circuit system for providing controlling electrical current to the camera lens to drive the lens holder to a predetermined position farther away from the case than an initial position, when the sound generator is producing sounds.

2. The portable electronic device as described in claim 1, wherein the camera lens includes an elastic spring for suspending the camera lens and providing the lens holder with a restoring force to force the camera lens move back to the initial position.

3. The portable electronic device as described in claim 2, wherein the camera lens further includes a lens coil and a lens magnet interacting with the lens coil.

4. The portable electronic device as described in claim 1, wherein the sound generator includes a housing attached to the case, a vibrator received in the housing for hitting the case to produce sound, and a suspension supporting the vibrator in the housing.

5. The portable electronic device as described in claim 4, wherein the sound generator further includes a linking post assembled with the vibrator for hitting the case.

6. A portable electronic device, comprising:
   a case;
   a camera lens having a lens coil and a lens magnet interacting with the lens coil, the camera lens further including a side wall and a lens holder moveable relative to the side wall;
   a sound generator attached to the case for producing sounds;
   a controlling system for applying electrical current to the lens coil for performing a functional movement and a noise eliminating movement of the lens holder;
   wherein the functional movement is from an initial position to a position where the camera lens at a focusing state, and the noise eliminating movement is from the initial position to a position where the lens holder is farther away from the case.

7. A method for eliminating noise comprising the steps of:
   providing a portable electronic including a case, a camera lens attached to the case and including a lens holder, a sound generator fixed to the case, and a controlling system electrically connected to the camera lens and the sound generator;
   judging whether the sound generator is working or not;
   applying controlling electrical current to the camera lens for drive the lens holder to a position farther away from the case, when the sound generator is working;
   revoking the controlling electrical current when the sound generator stops working.

8. The method for eliminating noise as described in claim 7, wherein the controlling system drives the lens holder for performing a functional movement by which focusing is achieved and a noise eliminating movement by which the lens holder is driven to a position farther away from the case.

* * * * *